United States Patent [19]
Fuller

[11] 3,718,079
[45] Feb. 27, 1973

[54] SHUTTER ASSEMBLY FOR PHOTOGRAPHIC EQUIPMENT

[75] Inventor: David L. Fuller, Atlanta, Ga.

[73] Assignee: Scripto, Inc., Atlanta, Ga.

[22] Filed: Oct. 8, 1971

[21] Appl. No.: 187,772

[52] U.S. Cl. ................................. 95/62, 350/267
[51] Int. Cl. .............................................. G03b 9/14
[58] Field of Search ............... 95/53 R, 62, 59, 58, 60; 350/160, 179, 205, 267, 271, 272

[56] References Cited

UNITED STATES PATENTS

| | | | |
|---|---|---|---|
| 3,295,913 | 1/1967 | Walther | 350/179 X |
| 2,800,844 | 7/1957 | Durst et al. | 95/60 |
| 2,827,839 | 3/1958 | Fuerst | 95/58 |
| 2,917,982 | 12/1959 | Martin | 95/62 |

*Primary Examiner*—Joseph F. Peters, Jr.
*Attorney*—Edward Taylor Newton et al.

[57] ABSTRACT

A between-the-lens shutter which includes a sealed casing containing a liquid of selected index of refraction to couple two optical elements of the camera lens and which also houses a pair of shutter blades. The shutter blades are mounted to pivot about an axis offset with respect to an aperture through the casing and are controlled by a common cocking-releasing cam. The shutters are cocked sequentially and released simultaneously. A high shutter speed effect is achieved by allowing both shutter blades, when released to return simultaneously toward their normal or rest positions and a slow shutter speed effect is achieved by delaying the return of the second-cocked shutter blade when the two blades are released simultaneously. The delayed return is achieved by a latch made operative by slightly shifting the pivot mounting for the two shutter blades, the latch temporarily holding the second shutter blade in cocked position and being disengaged from this shutter blade in response to movement of the other shutter blade to its rest position after both blades have been simultaneously released by the cam.

14 Claims, 18 Drawing Figures

INVENTOR:
DAVID L. FULLER
BY: Newton, Hopkins, & Ormsby
ATTORNEYS

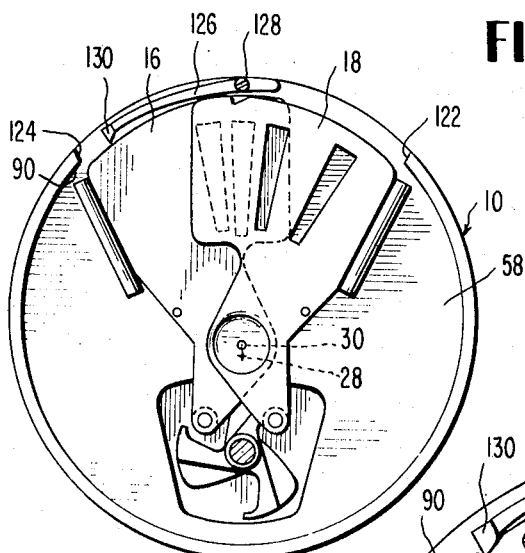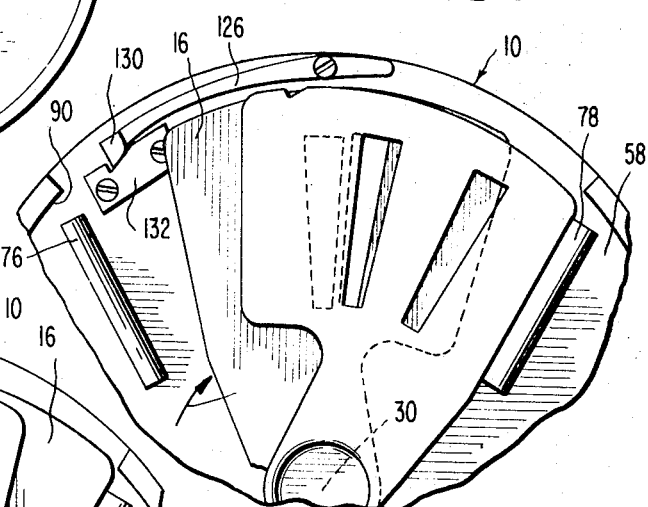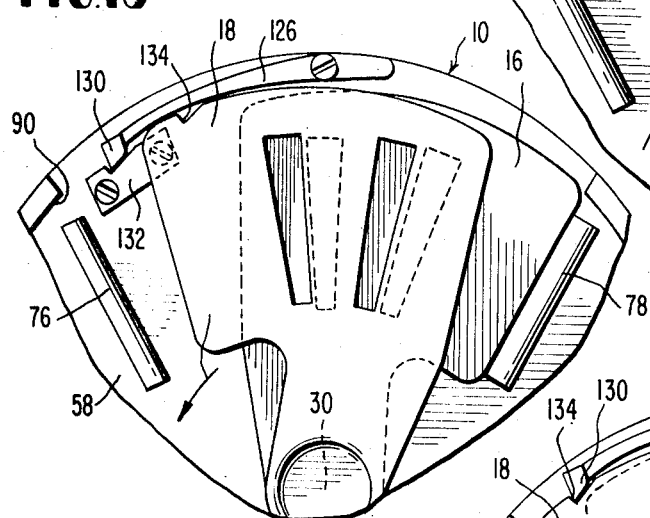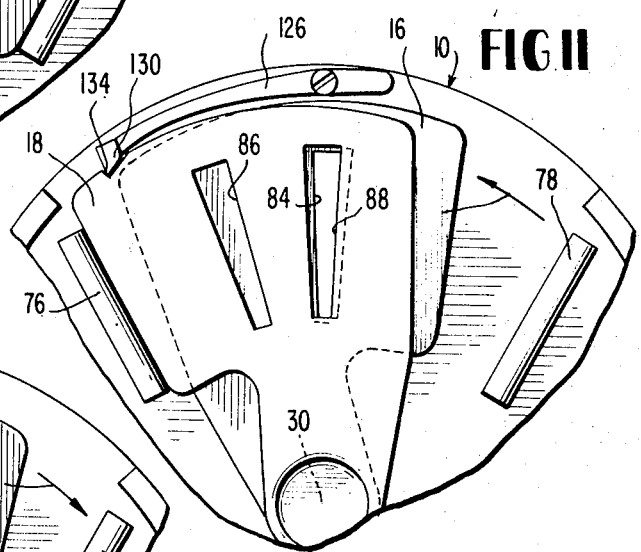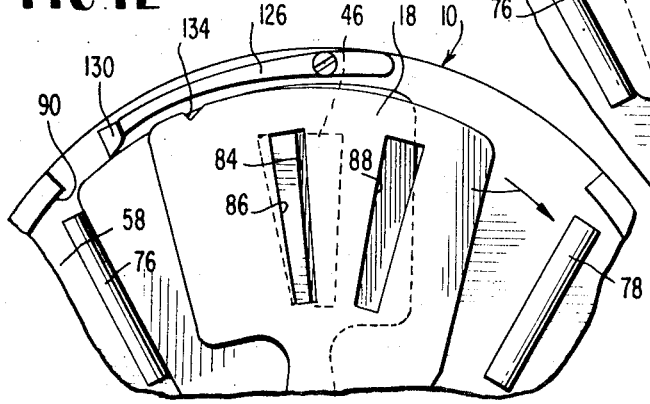

SHUTTER ASSEMBLY FOR PHOTOGRAPHIC EQUIPMENT

BACKGROUND OF THE INVENTION

The art relating to camera shutters in general has been very highly developed and an almost infinite variety of mechanisms and techniques have been employed. Many of them relate to specific means by which variable shutter speed is attained. Shutters for use between lens elements of an optical system have also been developed and are usually referred to as between-the-lens shutters.

However, a between-the-lens shutter housed within a casing which is sealed and contains a body of optical-coupling liquid has not, to my knowledge, been developed in the prior art. Further, I do not know of such an arrangement wherein selection of one of two shutter speed effects is provided.

BRIEF SUMMARY OF THE INVENTION

The present invention is directed to an extremely simple shutter blade arrangement whereby a between-the-lens shutter may be housed within a sealed casing containing an optical coupling liquid. The arrangement consists simply of two spring-returned shutter blades mounted on a common pivot and associated with a cocking-releasing cam which cocks the blades sequentially and releases them simultaneously. Each blade has an aperture or window which registers, in an intermediate position of each blade, with a casing aperture system which allows the image-producing light to reach the photosensitive film associated with the optical system of the camera. The return movements of the shutter blades are so adjusted as to cause these windows to register simultaneously with the casing aperture system after the blades are released by the cam and before the blades reach their rest positions. Neither of these windows registers with any portion of the casing aperture system when in either the rest position or the cocked position, so that the sequential cocking of the blades positively excludes the passage of light to the photosensitive film during cocking. When the two shutter blades return simultaneously from their cocked to their rest positions, a high shutter speed effect is attained.

A slow shutter speed effect, one-half of that achieved as above, is obtained by allowing only one of the shutter blades to return to its rest position during exposure of the photosensitive film. This action is obtained by providing a further window in the other shutter blade which registers with the casing aperture system when such other blade is in its cocked position, and by retaining this other blade in its cocked position after the blades are released by the cam until the stated one blade reaches or approaches its rest position.

The blade which is held or retained in cocked position after its release by the cam to achieve the slow shutter speed effect, is so retained through the use of a latch which normally does not engage this blade but which may do so when the pivot mounting for the blades is shifted slightly under selective control of the operator.

BRIEF DESCRIPTION OF THE DRAWING FIGURES

FIG. 8 is a view similar to FIG. 1 but showing the blades shifted from slow shutter speed effect;

FIG. 9 is a view showing the first blade moving into cocked position;

FIG. 10 is a view showing the first blade cocked and the second blade moving into cocked position;

FIG. 11 is a view showing both blades cocked and the second blade latched;

FIG. 12 is a view showing the first blade after release and return to normal position in which the second blade is released for return to its normal position.

DETAILED DESCRIPTION OF THE INVENTION

Figure 2:
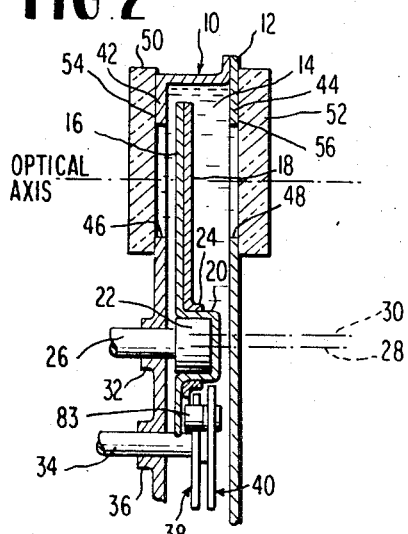
FIG. 2 is a sectional view illustrating the casing in association with components of the optical system and also illustrating the cam drive and shutter speed adjusting mechanism.

With reference first of all more particularly to FIG. 2, the shutter assembly of this invention will be seen to consist of a casing including a cup-shaped main body portion indicated generally by the reference character 10 and a cover plate 12, the main body portion and the cover plate being affixed together by suitable fasteners or the like so that the casing defines a cavity or chamber 14 filled with optical coupling fluid of index of refraction compatible with the optical system with which the shutter assembly is associated. The cup-shaped main body portion and cover plate of the casing are hermetically sealed to retain the optical coupling liquid within the cavity 14 and the housing also contains a pair of shutter blades 16 and 18 lying in overlapped relation as is shown, the shutter blade 16 having a hub portion 20 pivotally mounted on a journal 22 and the external surface of which forms a journal for the shutter blade 18 as indicated by the reference character 24. The journal 22 is fixed to a stub shaft 26 and the two elements 22 and 26 are mounted in eccentric relationship so that, in response to rotation of the stub shaft 26 to an angle of 180°, the effective pivot axis of the two blades 16 and 18 may be shifted between the position shown for the axis 28 and the position shown for the axis 30, the purpose of which will be presently apparent. The stub shaft 26 projects outwardly through the casing and is journalled therein as indicated by the reference character 32, it being understood that suitable seal means is associated between the casing and the stub shaft 26 to retain the hermetic seal as aforesaid.

The assembly also includes a further stub shaft 34 projecting through the casing in the bearing portion 36 thereof which is provided with a seal, not shown, similarly to the relationship of the casing to the stub shaft 26, and the stub shaft 34 has a primary cam arm assembly 38 fixed thereto for rotation therewith and, additionally, there is provided a secondary cam arm assembly 40 having limited lost motion with respect to the primary cam arm 38 and the stub shaft 34 but otherwise rotatable therewith, all as will hereinafter be apparent.

The two opposed wall portions 42 and 44 of the casing assembly are provided with aligned openings 46 ; and 48 which define an aperture through which light may pass, under control of the shutter blades 16 and 18 as hereinafter described for permitting the image-producing effect on the photosensitive film associated with the optical system of the camera. The optical system may be of the type such as disclosed, for example, in my copending application Ser. No. 94,830 filed Dec. 3, 1970 and, as is shown in FIG. 2, the shutter assembly is interposed between two optical elements 50 and 52 thereof. For this purpose, the outer surfaces 54 and 56 of the wall portions 42 and 44 are spaced apart through a selected distance and are of flat form, obtained by suitable milling or other machining operation to provide mounting surfaces against which the optical elements 50 and 52 respectively are engaged and secured. The optical elements thus close the openings 46 and 48 and retain the hermetic seal for the casing and shutter assembly so as to retain the optical coupling liquid within the cavity 14. It will be appreciated that such a system forms what is commonly referred to as a between-the-lens shutter system.

Figure 1:
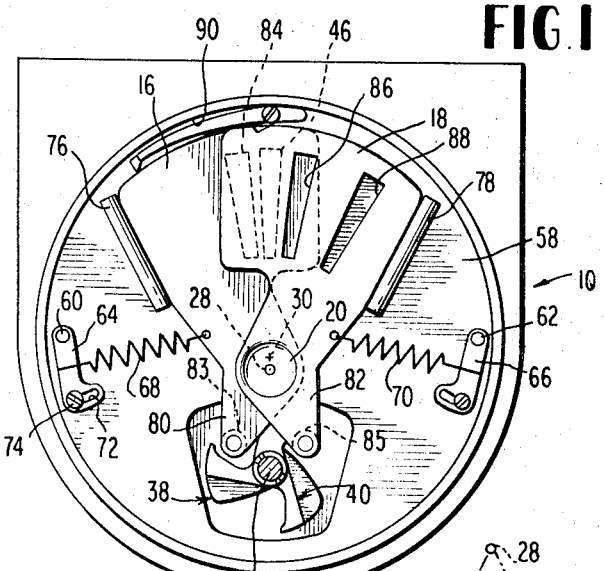
FIG. 1 is an elevational view showing the shutter casing with shutter blades in normal position.

With reference more particularly to FIG. 1, the details of the shutter assembly will be more readily apparent. As shown, the inner surface 58 of the wall 42 is provided with pins 60 and 62 which pivotally receive the respective bracket members 64 and 66 which serve as anchors for one end of the respective spring biasing elements 68 and 70. Each of the brackets 64 and 66 is provided with a slot such as that indicated by the reference character 72 and a screw element 74 projects through the slot and is threadedly engaged with the wall 42 to allow the brackets 64 and 66 to be moved thereby to adjust the bias of each spring 68 and 70 to a selected value.

Figure 4:
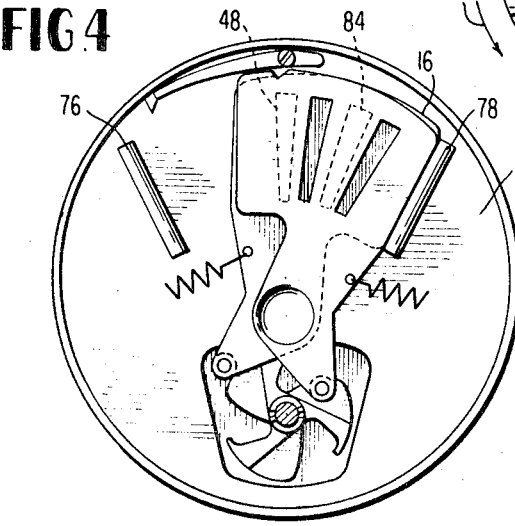
FIG. 4 is a view similar to FIGS. 1 and 3, but showing the first blade fully cocked.
Figure 4A:
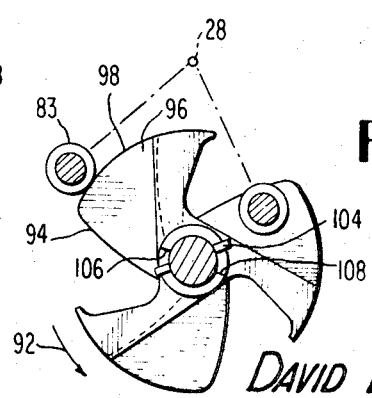
FIG. 4A is a view of the cam corresponding to FIG. 4.
Figure 6:
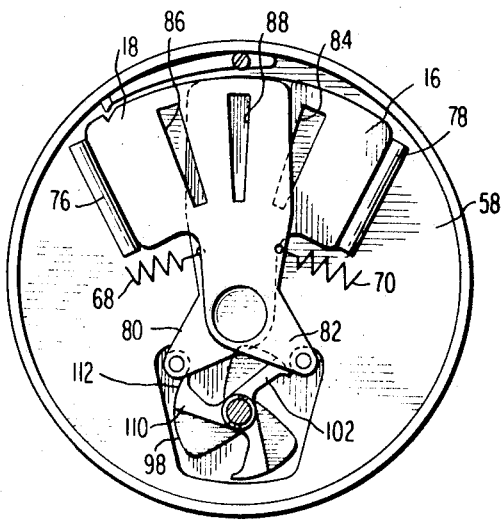
FIG. 6 is a view similar to FIG. 4 but showing the second blade fully cocked.
Figure 7:
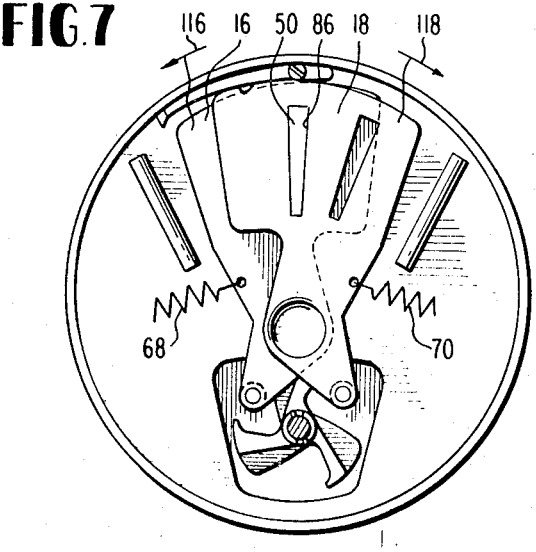
FIG. 7 is a view similar to FIG. 6 but showing the blade after their release from the cam.

The spring 68 is connected at its opposite end to the shutter blade 16 whereas the spring 70 is connected to the shutter blade 18 and the pretension on the spring elements serves normally to retain the two shutter blades in their rest or normal positions as is shown in FIG. 1, engaging against the stop elements 76 and 78 respectively. On the other side of the pivot axis for the shutter blades, the arm portions 80 and 82 thereof carry cam follower elements 83 and 85 for engagement with the respective elements of the cam assembly. The operation of the cam assembly is such as to cock first the blade 16 from its rest position shown in FIG. 1 to a cocked position as is shown in FIG. 4 and then to move the shutter blade 18 from its rest position shown in FIG. 1 to a cocked position as is shown in FIG. 6 and, thereafter, the blades simultaneously are released by the cam so as to permit the biasing means 68 and 70 to return the blades to their normal or rest positions. In the process of returning to their rest positions from their cocked positions, openings in the blades sweep past the openings 46 and 48 in the casing and simultaneously register therewith and with each other to effect exposure of the photosensitive film associated with the camera assembly. When both shutter blades 16 and 18 are permitted to return from their cocked to their normal positions simultaneously, as is shown in FIG. 7, after sequential cocking by the cam means, a high shutter speed effect is obtained inasmuch as the two blades are moving in relatively opposite directions, whereas in another position of the device, the blade 18 which is cocked after the blade 16 has been cocked remains in its cocked position until the blade 16 returns to its rest position so that the shutter speed effect is one half the speed of the aforementioned shutter speed effect attained by simultaneous movement of both blades from their cocked to the rest positions, all as will hereinafter be described.

For the purpose of obtaining the high shutter speed effect, the shutter blade 16 is provided with an opening or window 84 and the shutter blade 18 is provided with an opening or window 86. Each of these openings is non-aligned with the aperture openings 46, 48 when the blades are in their rest positions and when the blades are also in their cocked positions, as will be evident from a study of FIGS. 1 and 6 respectively. However, when the blade 18 is in its cocked position, it also presents an opening 88 which is in register with the aperture defining openings 46, 48 in the casing assembly. The purpose of this arrangement is to allow for the slow speed shutter effect hereinafter described.

Figure 1A:
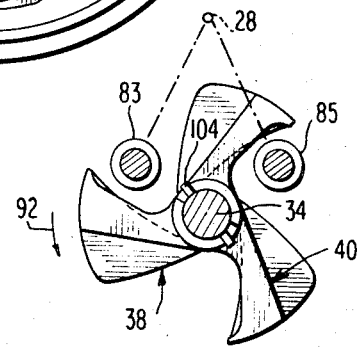
FIG. 1A is a view of the cam mechanism corresponding to the FIG. 1 position.
Figure 3:
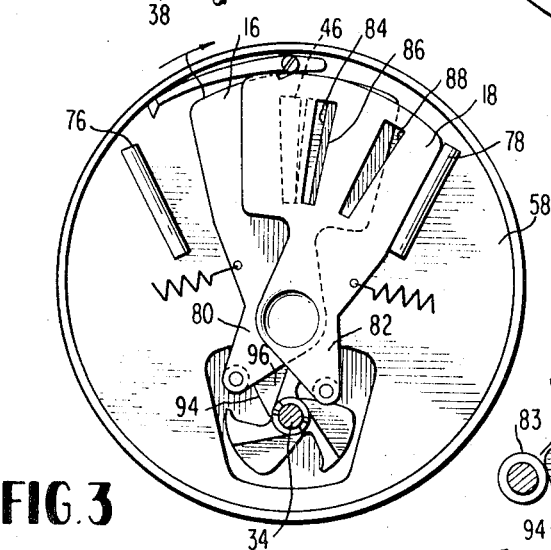
FIG. 3 is a view similar to FIG. 1 but showing the first blade being cocked.
Figure 3A:
FIG. 3A is a view of the cam corresponding to FIG. 3.

For the sequence of operations illustrated in FIGS. 1 and 3–7 inclusive, it will be understood that the high speed shutter effect is attained and that this effect is attained by virtue of the fact that the stub shaft 26 is rotated to such a position as effects the location of the pivot axis for the blades 16 and 18 along the axis 28 (FIG. 2) at which time the two shutter blades 16 and 18 are shifted relatively radially inwardly with respect to the side wall surface 90 of the casing so that neither is engageable with the latching mechanism hereinafter described. Starting from the sequence illustrated in FIG. 1A, the cam assembly is rotated in the direction of the arrow 92 until the ramp portion 94 of the primary cam finger 96 engages the cam follower 83 and causes the blade 16 to begin its movement from its rest position toward its cocked position, FIGS. 3 and 3A. Further rotation of the cam assembly in the direction of the arrow 92 causes the follower 83 to engage on the elongated toe portion 98 of the aforesaid cam finger 96, at which time the blade 16 has reached its fully cocked position whereat its opening 84 has swept past the aligned apertures 46, 48 and now resides in a position on the opposite side thereof, as is shown in FIG. 4.

Figure 5:
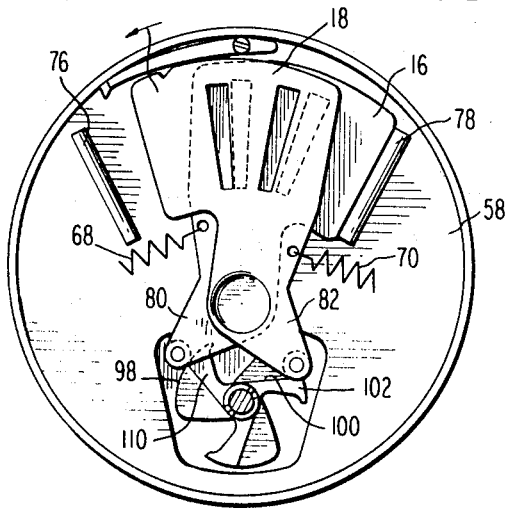
FIG. 5 is a view similar to FIG. 4 but showing the second blade being cocked.
Figure 5A:
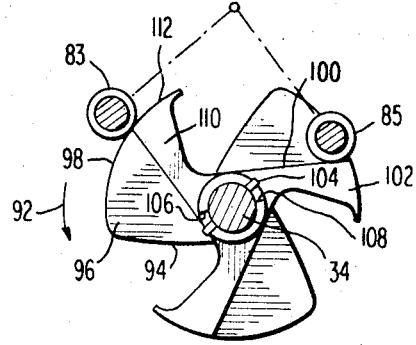
FIG. 5A is a view of the cam corresponding to FIG. 5.

Continued motion of the cam assembly in the direction of the arrow 92 causes the follower 83 (FIG. 5A) to approach the end of the elongate toe portion 98 of the cam finger 96 and, at the same time, causes the cam follower 85 to engage the ramp portion 100 of the secondary cam finger 102. As was previously discussed, the secondary cam has lost motion with respect to the shaft 34 and the primary cam assembly 38, by virtue of the fact that the stub shaft 34 carries a transverse pin 104 engaging within elongated slot portions 106 and 108 of the hub portion of the secondary cam assembly 40. As soon as the follower 85 is engaged by the ramp 100, the lost motion is assured of being taken up such that the preceding secondary cam finger 110 positions itself such that its elongate toe portion 112 effects a continuation of the elongate toe 98 of the cam finger 96 of the primary cam assembly, see particularly FIG. 5A. At this time, the first cocked shutter blade 16 will remain in its cocked position as is shown in FIG. 5 whereas the second shutter blade 18 will be moved from its rest position toward its cocked position. Continued motion of the cam assembly in the direction of the arrow 92 will cause the cam follower 85 to ride upon the elongate toe portion 114 of the secondary cam finger 102 whereas the cam follower 83 will correspondingly be engaged on the toe portion 112 of the secondary cam finger 110, as is shown in FIG. 6A, at which point both shutter blades 16 and 18 will be in their fully cocked position as is illustrated in FIG. 6.

Figure 6A:
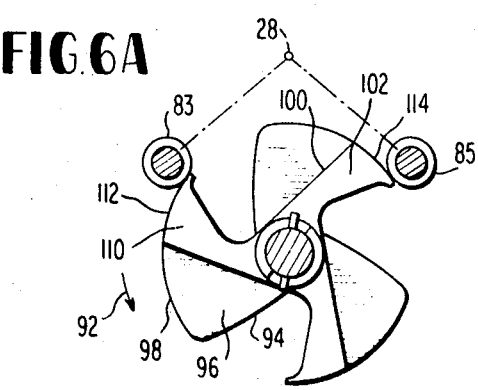
FIG. 6A is a view of the cam corresponding to FIG. 6.
Figure 7A:
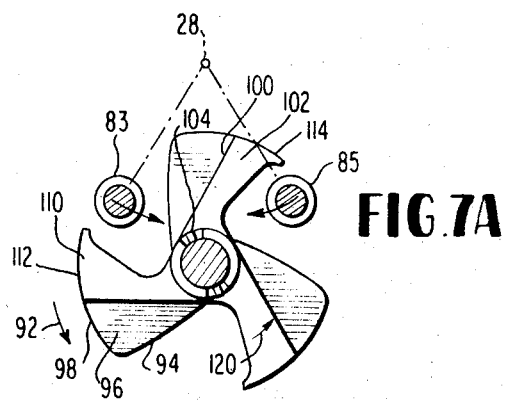
FIG. 7A is a view of the cam corresponding to FIG. 7.

As the cam assembly is rotated further beyond the position shown in FIG. 6A and as is illustrated in FIG. 7A, the two cam followers 83 and 85 simultaneously will be released from control by the cam assembly and the two biasing means 68 and 70 thereby simultaneously move the blades 16 and 18 in relatively opposite directions as is indicated by the arrows 116 and 118 simultaneously to return from their cocked to their rest positions. In the position illustrated in FIG. 7, the two blades 16 and 18 are just at that position in which the two openings 84 and 86 thereof are in registry with each other and with the openings 46, 48 allowing for full light transmission through the aperture system. The two shutter blades are moved in relatively opposite directions at substantially the same velocities and the shutter speed effect will thus be twice that attained by the speed of either blade alone.

FIG. 7A also shows the fact that the secondary cam assembly is "kicked" ahead when release of the cam followers 83 and 85 takes place and by virtue of continued rotation of the cam assembly in the direction of the arrow, 92, the kicking ahead of the secondary cam being indicated by the intermediate position of the secondary cam in FIG. 7A and by virtue of its kicked movement as indicated by the arrow 120. By providing this lost motion between the primary and secondary cam members, a very small and compact cam assembly is permitted and, as well, the dimensional characteristics of the blade arms or legs 80 and 82 and the disposition of the followers 83 and 85 is permitted. In addition, such an arrangement prevents an undesirable reflection of torque back thru stub shaft 34 at the time shutter blades 16 and 18 are released; thus assuring a smooth operating cycle.

By rotating the stub shaft 26 180° so that the effective pivot actions of the shutter blades 16 and 18 reside along the axis 30, rather than along the axis 28, a slow shutter speed effect may be obtained as is illustrated in FIGS. 8–12. As is shown in FIG. 8, the inner wall 90 of the casing assembly 10 is cut away as indicated at reference character 122 and 124 and a latch member 126 is mounted about a pivot axis 128, the latch mechanism being spring biased so that its latch head 130, FIG. 10, normally engages a stop member 132 secured to the wall 58 and with the lateral portion of the head 130 projecting sufficiently far as to be engaged by both the blade 16 and the blade 18 in the fashion hereinafter described.

In FIG. 8, it will be seen that in the normal positions of the two blades 16 and 18, the blade 16 engages the latch 126 and cams it away from its stop 132, so that the head 130 rests upon and engages the outer edge of the blade 16 as shown. When the pivot axis is at the position 28, the blades clear the head 130 of the latch but when the pivot axis has been shifted to the axis 30 as is shown in FIGS. 8–12, the blades may engage with the latch. FIG. 9 shows the blade 16 in the process of being moved from its rest to its cocked positions and after having cleared the head 130 of the latch 126, permitting the latter to spring to engagement with its stop 132. When the blade 16 is in its fully cocked position as is shown in FIG. 10 and the other blade 18 is being sequentially cocked toward its cocked position as is shown in FIG. 10, the outer edge of the blade 18 ultimately will engage the head 130 of the latch mechanism and, when the blade 18 is in its fully cocked position as is shown in FIG. 11, the head 130 of the latch mechanism 126 engages in the notch 134 in the outer edge of blade 18, substantially as is shown. This is illustrated in FIG. 11. FIG. 11 also illustrates the fact that when the cam releases both blades 16 and 18, only the blade 16 will return toward its rest position to effect the shutter speed action, since the blade 18 remains stationary and hence the shutter speed action will be one half the speed of the effect achieved in conjunction with the operation described with respect to FIGS. 1–7. Thus, the blade 16 will sweep its opening 84 into registry or alignment with the opening 88 in the blade 18 which, in its cocked position, is aligned with the opening 46, 48 of the casing assembly, as previously described. Thus, the opening 86 in the blade 18 takes no part in the shuttering action as was the case for the high speed shutter effect previously described.

As the blade 16 moves toward and into its rest position, it strikes the head 130 of the latch mechanism and cams it outwardly so that the head disengages from within the notch 134 in the blade 18, thus allowing same to be moved from its cocked to its normal position, during which movement no shutter action takes place because of the disposition of the aperture or window 84 in position past the apertures 46, 48.

As has been mentioned, the lost motion connection of the secondary cam arm assembly 40 with respect to the primary cam arm assembly 38 and the shaft 34 prevents undesirable feedback of torque to the shaft 34, and the driving mechanism therefor, when the cam followers 83 and 85 drop off the ends of the arms of the assembly, by allowing the secondary cam arm assembly to "kick back" due to its lost motion. In addition to this protecting feature, the lost motion and consequent "-kick back" perform a further and very important function. This further function is that the action described positively assures that the two blades are simultaneously released and, further, that the timing of this release is very precise. With respect to simultaneous release, it will be appreciated that if there is any tendency for either cam follower 83 or 85 to drop off before the other, the "kicking back" of the secondary cam arm assembly 40 due to this drop off will assure immediate and substantially simultaneous release or drop off of the other cam follower. As to the precision of timing, it will be seen that the "kick back" feature creates a condition in which the releasing or drop off action is very abrupt and has practically no transition time between fully-held and drop off conditions. The essentially line-contact relation between the followers 83 and 85 and the cam arms materially aids in this lack of transition.

What is claimed is:

1. A between-the-lens shutter assembly for photographic equipment, comprising in combination;
    a casing defining a cavity having a geometric center and having oppositely facing outer surfaces, said surfaces being provided with openings radially offset from said geometric center and defining an aperture therethrough;
    lens elements engaging said surfaces and closing said openings;
    optical coupling liquid filling said cavity to couple said lens elements;
    shutter means housed within said casing for selectively permitting light to pass through said aperture, said shutter means including a pair of shutter blades pivotally mounted about an axis near said geometric center and projecting radially therefrom to sweep back and forth over the region between said apertures and in parallel planes perpendicular to the axis of said aperture, said shutter blades having openings which register with said aperture in intermediate positions of said blades;
    means for biasing said blades to normal positioning; and
    cam means for sequentially cocking and then releasing said shutter blades.

2. The between-the-lens shutter assembly as defined in claim 1 including means for selectively altering the shutter speed effect of said shutter means.

3. A between-the-lens shutter assembly for photographic equipment, comprising in combination:
    a casing defining a cavity and having oppositely facing outer surfaces, said surfaces being provided with openings defining an aperture therethrough;
    lens elements engaging said surfaces and closing said openings;
    optical coupling liquid filling said cavity to couple said lens elements;
    shutter means housed within said casing for selectively permitting light to pass through said aperture, said shutter means including a pair of shutter blades pivotally mounted to sweep back and forth over the region between said apertures and in parallel planes perpendicular to the axis of said aperture, said shutter blades having openings which register with said aperture in intermediate positions of said blades;
    means for biasing said blades to normal positioning; and
    cam means for sequentially cocking and then releasing said shutter blades, said blades being pivotally mounted about a common axis and said means for biasing urging said blades in relatively opposite directions, and means for selectively latching one of said blades in cocked position to create a slow shutter speed effect.

4. The between-the-lens shutter assembly as defined in claim 3 wherein the other of said blades unlatches said one blade when said other blade returns to its normal position.

5. A shutter assembly for photographic equipment comprising, in combination;
    means for defining an aperture through which light is to be admitted under control of a shutter assembly to pass through an associated optical system;
    a pair of overlapped shutter blades normally blocking said aperture;
    means for pivotally mounting said shutter blades for movement between cocked and normal positions about an axis offset with respect to said aperture;
    means for biasing said shutter blades in relatively opposite directions about said axis to reside in their normal positions;
    cam means for camming first one of said blades and then the other of said blades to their cocked positions in opposition to said biasing means and thereafter to disengage said blades simultaneous whereby they may be returned by said biasing means to their normal positions; and
    each shutter blade having an opening therein positioned so that the two blades register their openings with each other and with said aperture during movement of said blades from their cocked to their normal positions.

6. The shutter assembly as defined in claim 5 wherein said cam means comprises a rotary cam having at least a pair of primary radial arms disposed in angularly spaced relation with respect to the axis of rotation of said cam, said cam having a pair of secondary radial arms associated with said primary arms, said primary and said secondary arms being offset with respect to each other longitudinally of said axis of rotation;
    means for rotating said cam in one direction about its axis of rotation; and
    said one blade having a follower engaged sequentially by said primary arms and said other blade having a follower engaged sequentially by said secondary arms.

7. The shutter assembly as defined in claim 5 including at least the opening in said other blade which is cocked last being out of registry with said aperture when said other blade is in its normal position and at least the opening in said one blade which is cocked first being out of registry with said aperture when said one blade is in its cocked position, whereby at least one blade is always blocking said aperture during the sequential cocking of said blades.

8. The shutter assembly as defined in claim 7 wherein that blade which is cocked last also includes an opening registering with said aperture when such blade is cocked, and means for selectively latching the last cocked blade in cocked position to effect a slow shutter speed effect when said blades are released by said cam means.

9. The shutter assembly as defined in claim 8 wherein the last means includes a latch element and means for shifting said blades relative to said latch element.

10. A shutter assembly as defined in claim 6 wherein said secondary radial arms are connected in lost-motion relation to said primary arms whereby precise and substantially simultaneous release of said shutter blades is assured.

11. A shutter assembly for photographic equipment comprising, in combination:
   means for defining an aperture through which light is to be admitted under control of a shutter assembly to pass through an associated optical system;
   a pair of overlapped shutter blades normally blocking said aperture;
   means for mounting said shutter blades for movement between cocked and normal positions with respect to said aperture;
   means for biasing said shutter blades to reside in their normal positions; and
   cam means for camming said shutter blades from their normal to their cocked positions and then to release them, said cam means including lost-motion means for assuring precise and substantially simultaneous release of both shutter blades.

12. A shutter assembly as defined in claim 11 wherein said cam means comprises a multi-arm primary cam and a drive shaft to which said primary cam is affixed, said lost-motion means comprising a multi-arm secondary cam connected to said drive shaft for limited lost-motion with respect thereto.

13. A shutter assembly as defined in claim 12 including a cylindrical cam follower carried by each of said shutter blades engageable by the arms of said primary and secondary cams and making essentially line contact therewith to assure precise and simultaneous release of both shutter blades.

14. A shutter assembly as defined in claim 12 including a casing housing same and a quantity of optical coupling liquid filling said casing optically to couple a pair of separated lens elements between which said casing is positioned.

* * * * *